Oct. 14, 1958  H. J. THOMA  2,856,250
PISTONS AND PISTON RODS
Filed Feb. 13, 1957
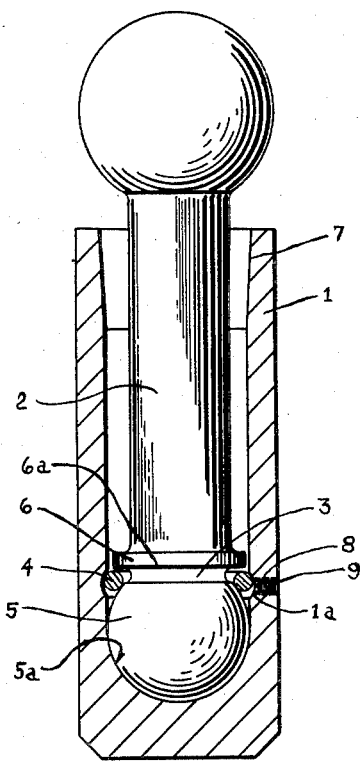
Hans Johannes Thoma INVENTOR.
BY *Allen A. Wenke*
Attorney

United States Patent Office 2,856,250
Patented Oct. 14, 1958

2,856,250
PISTONS AND PISTON RODS

Hans Johannes Thoma, Zurich, Switzerland

Application February 13, 1957, Serial No. 639,940

8 Claims. (Cl. 309—20)

This invention relates to improvements in pistons and piston rods and has for an object to provide a simple effective connection means between a piston and a connecting rod, particularly of the ball joint type, wherein an expanding spring ring bears between an exterior surface on the connecting rod and an interior groove in the piston to lock the connecting rod within the piston.

It has been proposed heretofore to provide a ball and socket joint in which a split spring ring is located in an internal groove in the piston which groove has its outer face transverse to the axis of the piston and being of such a depth that the connecting rod ball may be forced into the piston while spreading the ring into said groove. Such a device has the disadvantage that the connecting rod may just as easily be withdrawn from the piston so that the parts may come apart in use.

It is therefore an object to provide an improved construction in which this objection is overcome by so forming said internal groove that expansion of the ring cams the ring inward against the ball to press the ball against its seat and lock it there against any separating force.

Spring rings of this type may, under certain conditions, be inserted by means of a split-sleeve tool surrounding the connecting rod and capable of forcing the split ring to a position where it can snap into an internal groove in the piston. Such constructions have the disadvantage that a separate tool is required to force the ring into place and, more importantly, such construction cannot be used where the device in question is used in high pressure units such as hydraulic pumps or motors in which case the connecting rod body is made as large as possible and the piston wall thickness is made as great as possible, leaving very little space between the rod and the piston. In such cases, it is difficult or impossible to introduce a tool for the purpose of seating the spring ring. This is particularly true of cases where the connecting rod is formed also with a ball on the outer end and where said ball is relatively large. Furthermore, in cases where the connecting rod is short relative to the piston so that the ball on its outer end is close to the outer end of the piston, it becomes impossible to introduce a suitable ring inserting tool.

It is, therefore, an object of the invention to construct the connecting rod in such a manner that it presents a shoulder lying outwardly of the spring ring so that the connecting rod itself through such shoulder or shoulders may serve as the tool for inserting the spring ring into the piston.

Another object is to provide the outer end of the piston with an internal conical formation to contract the spring ring while it is being forced into the piston.

Another object is to provide at least one opening in the side of the piston adjacent the desired spring location to permit observation of the spring ring and to correct mislocation thereof by means of a tool passing through said opening.

Another object is to provide means for closing such opening or openings by means of a screw, rivet or the like, which may also serve to hold the spring ring in place.

Other objects will appear from the following description of an illustrative embodiment of the invention taken together with the attached drawing wherein is shown a hollow piston having a seat, a piston rod having a seating end bearing against said seat to form an articulating joint with the piston together with an expanding spring ring holding the connecting rod and piston together.

Referring to said drawing, the numeral 1 indicates a hollow piston provided with a hemispherical seat 5a within which bears the ball end 5 of a connecting rod 2. The interior of the piston is formed with a groove 1a within which is located an expanding spring ring 4. Said ring presses outwardly against the upper surface of the groove 1a in such a way as to bear tightly against the upper part of the ball 5. The connecting rod therefore may articulate relative to the piston through a small angle while its ball end is pressed tightly into the spherical seat in the piston. It will be noted that the slope of the upper part of the groove 4 where it is contacted by the ring should be such that expansion of the ring forces the ball against the seat.

The piston 2 is formed with an enlargement or collar 6 providing a downwardly facing shoulder 6a. This permits the connecting rod to be used as a tool for assembling the rod and ring into the piston. The split spring ring 4 is stripped over the ball 5 to a point near the shoulder 6a. Its form is such that it is substantially larger in diameter than indicated in the drawing. The ring is now compressed to an outer diameter equal to the inner diameter of the skirt of the piston 1. During this time, it lies partly within a groove 3 adjacent to the shoulder 6a. Just before the ball 5 reaches the seat 5a in the piston, the ring 4 snaps outwardly into the groove 1a and in so doing presses against the upper edge of the ball 5 and presses the ball against the seat 5a holding it securely against the pull of the connecting rod relative to the piston. This pull may be due to inertia forces or to pressure on the piston face lower than that existing outwardly of the piston.

In order to aid in contracting the ring 4 during its insertion into the piston, the latter may be formed with a conical mouth 7 as shown. This conical formation is also desirable in certain types of pumps, such as axial piston pumps without universal drive whereby the shank of the connecting rod bears within said conical mouth to cause driving of the usual cylinder block in synchronism with the usual driving flange. However, in case where it is preferred not to use this conical formation, a suitable split bushing formed with a conical mouth may be used to contract the ring 4 during its insertion.

To make sure that the ring is located properly, it may be desirable to provide one or more radial holes 8 through which the position of the ring may be observed and through which a suitable tool may be inserted as necessary to properly position the ring. Furthermore, plugs in the form of a screw or rivet 9 may be provided to close said openings. These plugs may also be formed with an internal projection, if desired, to assure that the ring is retained in its proper holding position.

It will be noted that the construction shown and described will serve admirably to accomplish the objects stated above. It is to be understood, however, that the construction disclosed above is intended merely as illustrative of the invention and not as limiting as various modifications therein may be made without departing from the invention as defined by a proper interpretation of the claims which follow.

I claim:

1. In a device of the class described, a cup-shaped piston formed at its bottom with a spherical seat and a groove outwardly of the seat, a piston rod having a ball end conforming to the spherical seat in the piston and adapted to bear against said seat to form an articulating joint with the piston, and an expansible spring ring adapted to press outwardly against the outer side of said groove to cam said ring against the ball so that it presses said connecting rod ball end against the spherical seat in the piston, said connecting rod being formed with a shoulder outwardly of the spring ring and adapted to force the ring into the piston sufficiently far to allow it to expand into said groove.

2. In a device of the class described, a cup-shaped piston formed at its bottom with a spherical seat and a groove outwardly of the seat, a piston rod having a ball end conforming to the spherical seat in the piston, and adapted to bear against said seat to form an articulating joint with the piston, and an expansible spring ring adapted to press outwardly against the outer side of said groove to cam said ring against the ball so that it presses said connecting rod ball end against the spherical seat in the piston, said connecting rod being formed with a shoulder outwardly of the spring ring and adapted to force the ring into the piston to contract the ring while it is entering the piston and to force the ring into the piston sufficiently far to allow it to expand into said groove.

3. The combination according to claim 1 in which the shoulder is formed by a circumferential enlargement on the connecting rod.

4. The combination according to claim 2 in which the outer end of the piston is provided with a generally conical internal enlargement to receive the expanded ring and to contract it to the interior diameter of the piston as it is being forced into the piston.

5. The combination according to claim 2 in which the outer end of the piston is provided with a split bushing formed with a generally conical internal enlargement to receive the ring and to contract it to the interior diameter of the piston as it is being forced into the piston.

6. The combination according to claim 2 in which the interior of the piston is so formed as to provide its outer end with a generally conical internal enlargement to receive the ring and to contract it to the interior diameter of the piston as it is being forced into the piston.

7. The combination according to claim 1 in which the piston is provided with at least one radial perforation near said groove to permit inspection of the ring after assembly.

8. The combination according to claim 1 in which the piston is provided with at least one radial perforation near said groove to permit inspection of the ring after assembly, together with a plug for sealing said perforation.

References Cited in the file of this patent

UNITED STATES PATENTS

| | | |
|---|---|---|
| 738,503 | Waters | Sept. 8, 1903 |
| 769,248 | Brainard | Sept. 6, 1904 |